United States Patent
Kawahara et al.

(10) Patent No.: US 7,245,310 B2
(45) Date of Patent: Jul. 17, 2007

(54) METHOD AND APPARATUS FOR DISPLAYING RELATED TWO-DIMENSIONAL WINDOWS IN A THREE-DIMENSIONAL DISPLAY MODEL

(75) Inventors: Hideya Kawahara, Mountain View, CA (US); Daniel J. Baigent, Sunnyvale, CA (US); Brian D. Nitz, Malahide (IE); Curtis J. Sasaki, Sunnyvale, CA (US); Jonathan I. Schwartz, Menlo Park, CA (US); Hans E. Muller, Saratoga, CA (US); Carl I. Gadener, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 538 days.

(21) Appl. No.: 10/714,084

(22) Filed: Nov. 14, 2003

(65) Prior Publication Data

US 2005/0060661 A1 Mar. 17, 2005

Related U.S. Application Data

(63) Continuation-in-part of application No. 10/663,609, filed on Sep. 15, 2003.

(51) Int. Cl.
*G06T 15/00* (2006.01)
(52) U.S. Cl. ...................... 345/782; 715/848
(58) Field of Classification Search ............. 345/156, 345/157, 158, 653, 654, 663, 664, 679, 680; 715/782, 836
See application file for complete search history.

(56) References Cited

U.S. PATENT DOCUMENTS

| | | | | |
|---|---|---|---|---|
| 5,764,237 A | * | 6/1998 | Kaneko | 345/552 |
| 5,774,125 A | | 6/1998 | Suzuoki et al. | 345/430 |
| 6,229,542 B1 | | 5/2001 | Miller | 345/358 |
| 7,039,801 B2 | * | 5/2006 | Narin | 713/152 |
| 2004/0090467 A1 | | 5/2004 | Bonura et al. | 345/790 |

FOREIGN PATENT DOCUMENTS

GB    2 387 754 A    10/2003

* cited by examiner

*Primary Examiner*—Richard Hjerpe
*Assistant Examiner*—Jean Lesperance
(74) *Attorney, Agent, or Firm*—Park, Vaughan & Fleming, LLP

(57) ABSTRACT

One embodiment of the present invention provides a system that facilitates displaying multiple two-dimensional (2D) windows with related content within a three-dimensional (3D) display model. The system starts by receiving a command to display a first window within the 3D display model. In response to the command, the system displays the content of the first window on a first surface of a 3D object. Next, the system receives a command to display a second window within the 3D display model, wherein content of the second window is related to content of the first window. The system then displays content of the second window on a second surface of the 3D object.

30 Claims, 5 Drawing Sheets

METHOD AND APPARATUS FOR DISPLAYING RELATED TWO-DIMENSIONAL WINDOWS IN A THREE-DIMENSIONAL DISPLAY MODEL

RELATED APPLICATION

This application is a continuation-in-part of, and hereby claims priority under 35 U.S.C. § 120 to, U.S. patent application Ser. No. 10/663,609, entitled, "Method and Apparatus for Manipulating Two-Dimensional Windows Within a Three-Dimensional Display Model," by inventor Hideya Kawahara, filed 15 Sep. 2003.

BACKGROUND

1. Field of the Invention

The present invention relates to user interfaces for computer systems. More specifically, the present invention relates to a method and an apparatus for displaying related two-dimensional windows within a three-dimensional display model.

2. Related Art

Today, most personal computers and other high-end devices support window-based graphical user interfaces (GUIs), which were originally developed back in the 1980's. These window-based interfaces allow a user to manipulate windows through a pointing device (such as a mouse), in much the same way that pages can be manipulated on a desktop. However, because of limitations on graphical processing power at the time windows were being developed, many of the design decisions for windows were made with computational efficiency in mind. In particular, window-based systems provide a very flat (two-dimensional) 2D user experience, and windows are typically manipulated using operations that keep modifications of display pixels to a minimum. Even today's desktop environments like Microsoft Windows (distributed by the Microsoft Corporation of Redmond, Wash.) include vestiges of design decisions made back then.

In recent years, because of increasing computational requirements of 3D applications, especially 3D games, the graphical processing power of personal computers and other high-end devices has increased dramatically. For example, a middle range PC graphics card, the "GeForce2 GTS" distributed by the NVIDIA Corporation of Sunnyvale, Calif., provides a 3D rendering speed of 25 million polygon-per-second, and Microsoft's "Xbox" game console provides 125 million polygon-per-second. These numbers are significantly better than those of high-end graphics workstation in the early 1990's, which cost tens of thousands (and even hundreds of thousands) of dollars.

As graphical processing power has increased in recent years, a number of 3D user interfaces have been developed. These 3D interfaces typically allow a user to navigate through and manipulate 3D objects. However, these 3D interfaces are mainly focused on exploiting 3D capabilities, while little attention has been given to supporting existing, legacy window-based 2D applications within these 3D user interfaces.

If a 3D interface is to be commercially viable, it is crucial to be able to support the large existing base of legacy 2D applications. One of the problems that arises in trying to use 2D applications within a 3D interface is how to arrange related 2D windows in an intuitive and convenient way within the 3D interface. Note that within a 3D interface, it is possible to indicate relationships between 2D windows through a large number of possible spatial relationships.

Hence, what needed is a method and an apparatus for displaying related 2D window-based applications within a 3D user interface.

SUMMARY

One embodiment of the present invention provides a system that facilitates displaying multiple two-dimensional (2D) windows with related content within a three-dimensional (3D) display model. The system starts by receiving a command to display a first window within the 3D display model. In response to the command, the system displays the content of the first window on a first surface of a 3D object. Next, the system receives a command to display a second window within the 3D display model, wherein content of the second window is related to content of the first window. The system then displays content of the second window on a second surface of the 3D object.

In a variation on this embodiment, the second surface of the 3D object is located on the opposite side of the 3D object from the first surface, wherein only one of the first surface of the 3D object and the second surface of the 3D object is visible at any given time.

In a further variation, the system rotates the 3D object so that the second surface is visible.

In a variation on this embodiment, the system receives a command to display a third window within the 3D display model. In response to this command, the system displays content of the third window on a surface of a second 3D object, wherein the second 3D object is located in close proximity to the 3D object in the 3D display model.

In a further variation, the system receives a modal dialog related to the content of the first window, wherein the modal dialog must be responded to before any other action may be taken on an application. In order to display the modal dialog, the system rotates the 3D object so that the second surface is visible and the first surface is hidden, and displays the modal dialog on the second surface.

In a further variation, when the modal dialog is displayed, the system rotates any related 3D objects so that related content on the surface of the related 3D objects is not visible until the modal dialog is acknowledged.

In a variation on this embodiment, the first window and the second window are associated with different applications.

In a variation on this embodiment, upon receiving the command to display the second window, the system looks up an identifier for the second window in a lookup table that contains entries specifying relationships between windows. The system then determines if the second window is related to the first window, and if so, displays content of the second window on the second surface of the 3D object. If the first and second windows are unrelated, the system displays content of the second window on a surface of a distant 3D object, which is not located in close proximity to the 3D object in the 3D display model.

In a variation on this embodiment, the system receives a notification that the first window and the second window contain related content. In response to this notification, the system creates an association between the first window and the second window in a lookup table.

In a variation on this embodiment, the 3D object is stacked on top of the second 3D object so that the second 3D object is obscured by the 3D object from the viewpoint of a user.

In a variation on this embodiment, the 3D object is translucent so that the second 3D object is visible through the 3D object.

Table 1 illustrates an exemplary lookup table in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a-computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

3D Display Model

Figure 1:
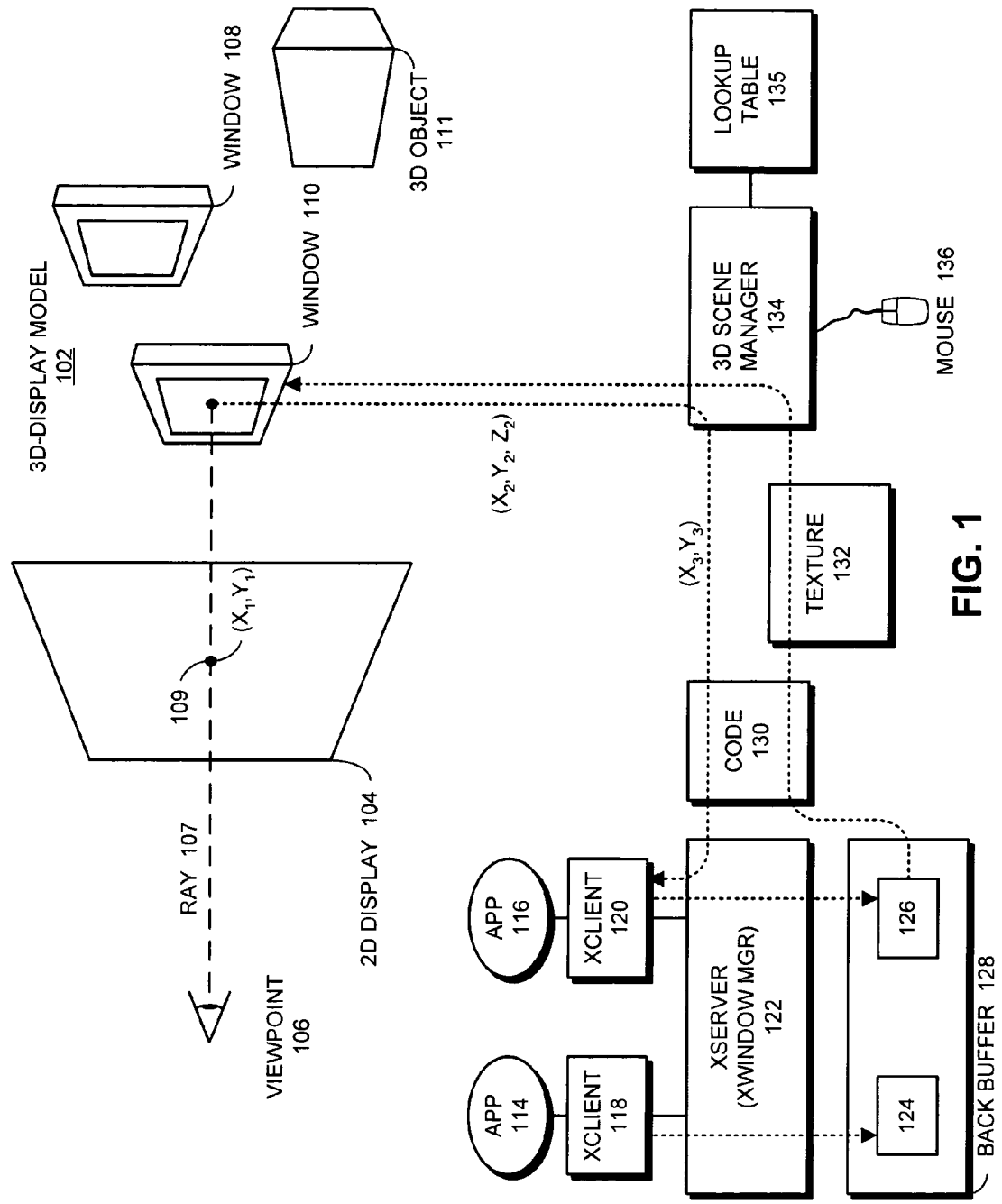
FIG. 1 illustrates a 3D display model with supporting components in accordance with an embodiment of the present invention.
Figure 2:
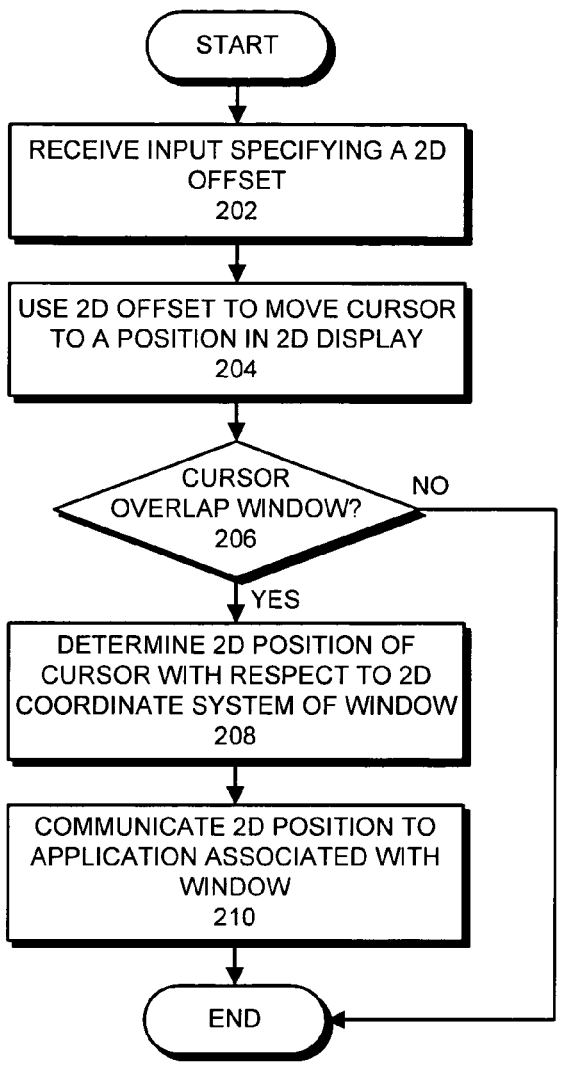
FIG. 2 presents a flow chart illustrating how input from a pointing device is communicated to an application associated with a window in a 3D display model in accordance with an embodiment of the present invention.

FIG. 1 illustrates 3D display model 102 with supporting components in accordance with an embodiment of the present invention. More specifically, the top portion of FIG. 1 illustrates 3D display model 102, which includes a number of 3D objects including window 108, window 110, and 3D object 111. Note that windows 108 and 110 are actually 3D objects which represent 2D windows. Hence, windows 108 and 110 can be moved and rotated within 3D display model 102, while they provide a 2D output and receive input for associated 2D applications. 3D display model 102 can additionally include a background (which is not shown).

Windows 108 and 110 can be associated with a number of window attributes. For example, window 110 can include x, y, and z position attributes that specify the 3D position of the center of window 110 within 3D display model 102, as well as a rotation attributes that specify rotations of window I 1O around horizontal and vertical axes. Window 110 can also be associated with scaling factor, translucency and shape attributes.

3D objects within 3D display model 102 are viewed from a viewpoint 106 through a 2D display 104, which is represented by a 2D rectangle within 3D display model 102. During the rendering process, various well-known techniques, such as ray tracing, are used to map objects from 3D display model 102 into corresponding locations in 2D display 104.

The bottom portion of FIG. 1 illustrates some of the system components that make it possible to map 2D windows into 3D display model 102 in accordance with an embodiment of the present invention. Referring to FIG. 1, applications 114 and 116 are associated with windows 108 and 110, respectively. A number of components are involved in facilitating this association. In particular, applications 114 and 116 are associated with xclients 118 and 120, respectively. Xclients 118 and 120 in turn interact with xserver 122, which includes an associated xwindow manager. These components work together to render output bitmaps 124 and 126 for applications 114 and 116 to be displayed in windows 108 and 110, respectively. These bitmaps 124 and 126 are maintained within back buffer 128.

Code module 130 causes bitmaps 124 and 126 to be displayed on corresponding windows 108 and 110. More specifically, code module 130 retrieves bitmap 126 and coverts it into a texture 132, which is displayed on the front face of window 110. This is accomplished though interactions with 3D scene manager 134. Bitmap 124 is similarly mapped into window 108.

3D scene manager 134 can also received input from a 2D pointing device, such as mouse 136, and can communicate this input to applications 114 and 116 in the following way. 3D scene manger 134 first receives an input specifying a 2D offset from mouse 136 (step 202). Next, the system uses this 2D offset to move a cursor 109 to a new position ($x_1$, $y_1$) in 2D display 104 (step 204).

The system then determines if cursor 109 overlaps a window in 3D display model 102 (step 206). This can be accomplished by projecting a ray 107 from viewpoint 106 through cursor 109 and then determining if the ray intersects a window. If there is no overlap, the process is complete.

Otherwise, if there is overlap, the system uses the 3D position ($x_2$,$y_2$,$z_2$) within display model 102 where ray 107 intersects window 110, as well as attributes of window 110, such as position and rotation attributes, to determine the 2D position ($x_3$,$y_3$) of this intersection with respect to a 2D coordinate system of window 110 (step 208). The system then communicates this 2D position (x_3,y_3) to application 116, which is associated with window 110 (step 210).

3D scene manger 134 is also coupled to lookup table 135. Lookup table 135 contains entries specifying relationships between windows. As described later in FIG. 6, lookup table 135 allows 3D scene manager 134 to determine if windows 108 and 10 should be displayed on separate objects, or if they should be displayed on different sides of the same object within 3D display model 102.

Various user inputs, for example through mouse 136 or a keyboard, can be used to manipulate windows within 3D display model 102.

Rotation Around Viewpoint

Figure 3:
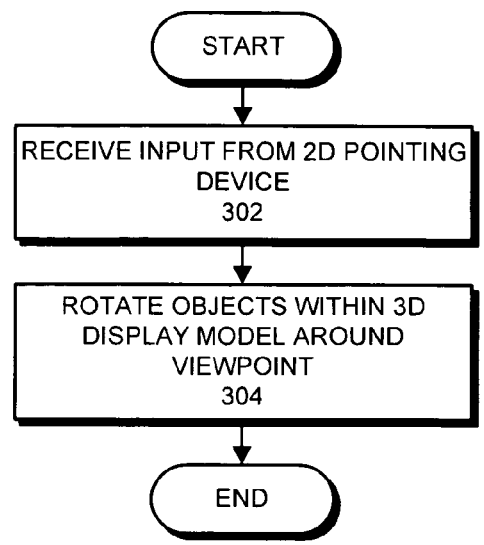
FIG. 3 presents a flow chart illustrating how input from a pointing device causes objects to rotate around a viewpoint in the 3D display model in accordance with an embodiment of the present invention.

FIG. 3 presents a flow chart illustrating how input from a pointing device causes objects to rotate around a viewpoint 106 in 3D display model 102 in accordance with an embodiment of the present invention. First, the system receives an input from a 2D pointing device indicating that a rotation is desired (step 302). For example, the system can receive a movement input from mouse 136. In response to this input, the system can rotate objects within the 3D display model around viewpoint 106, or alternatively around another point within 3D display model 102 (step 304). This rotational motion makes it easier for a user to identify window boundaries and also gives the user a feeling of depth and space.

Displaying Additional Information on Back of Window

Figure 4A:
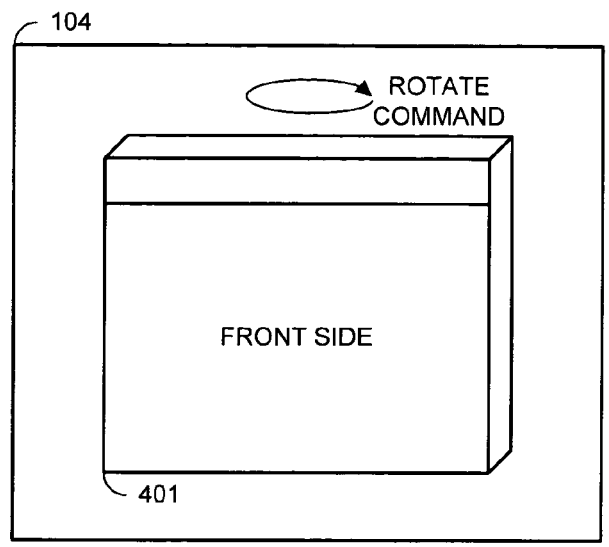
FIG. 4A illustrates an exemplary window in the 3D display model in accordance with an embodiment of the present invention.
Figure 4C:
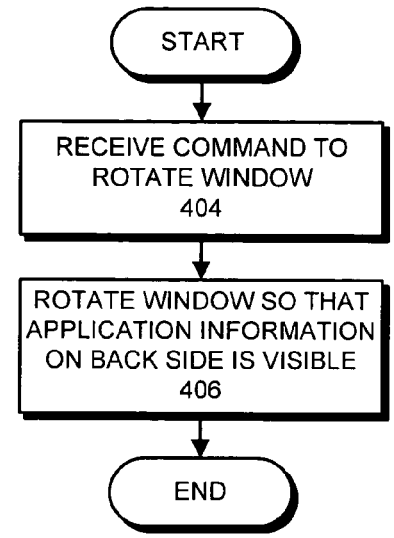
FIG. 4C presents a flow chart of the process of rotating a window in accordance with an embodiment of the present invention.
Figure 4B:
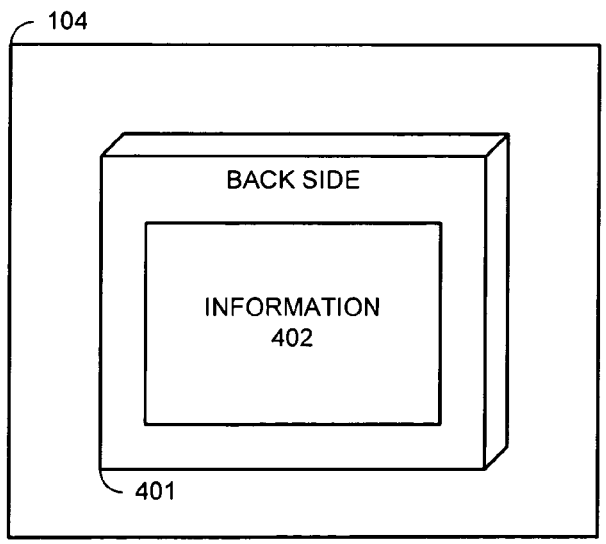
FIG. 4B illustrates how the exemplary window is rotated to display application information on the backside of the window in accordance with an embodiment of the present invention.

FIG. 4A illustrates an exemplary window 401 in 3D display model 102, and FIG. 4B illustrates how window 401 is rotated to display additional information on the backside of window 401 in accordance with an embodiment of the present invention. Referring to the flow chart in FIG. 4C, the system first receives a command (possibly through a mouse or a keyboard) to rotate window 401 (step 404). In response to this command, the system rotates window 401 so that additional information 402 on the backside of window 401 becomes visible (step 406). Additional information 402 can include application information, such as application version information, application settings, application parameters, application properties, and notes associated with a file or a web page that is displayed in the window. In one embodiment of the present invention, the system allows the user to modify application information 402 on the backside of window 401. This enables the user to change application parameters, if necessary.

This additional information 402 can also include a window associated with the same application, a window associated with a related application, a window associated with a different application, a modal dialog associated with the application, or a modal dialog associated with the OS.

3D Object with Multiple Viewing Surfaces

Figure 5:
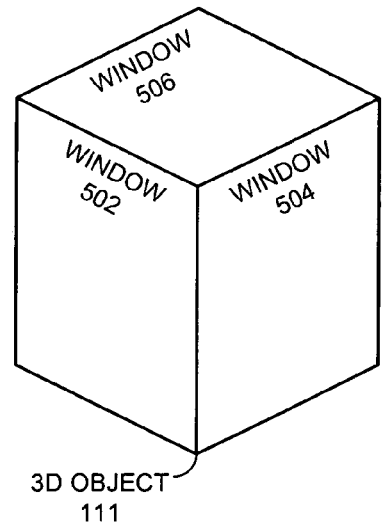
FIG. 5 illustrates a 3D object with multiple viewing surfaces in accordance with an embodiment of the present invention.

FIG. 5 illustrates 3D object 111 with multiple viewing surfaces in accordance with an embodiment of the present invention. In the orientation shown in FIG. 5, 3D object 111 has 3 visible surfaces, which display window 502, window 504, and window 506. Note that 3D object 111 has additional surfaces that are not visible in the current orientation. Also note that in general, 3D object 111 is not limited to being a slate or a cube, and can be any size or shape, and can have any number of visible surfaces.

Displaying a Window

Figure 6:
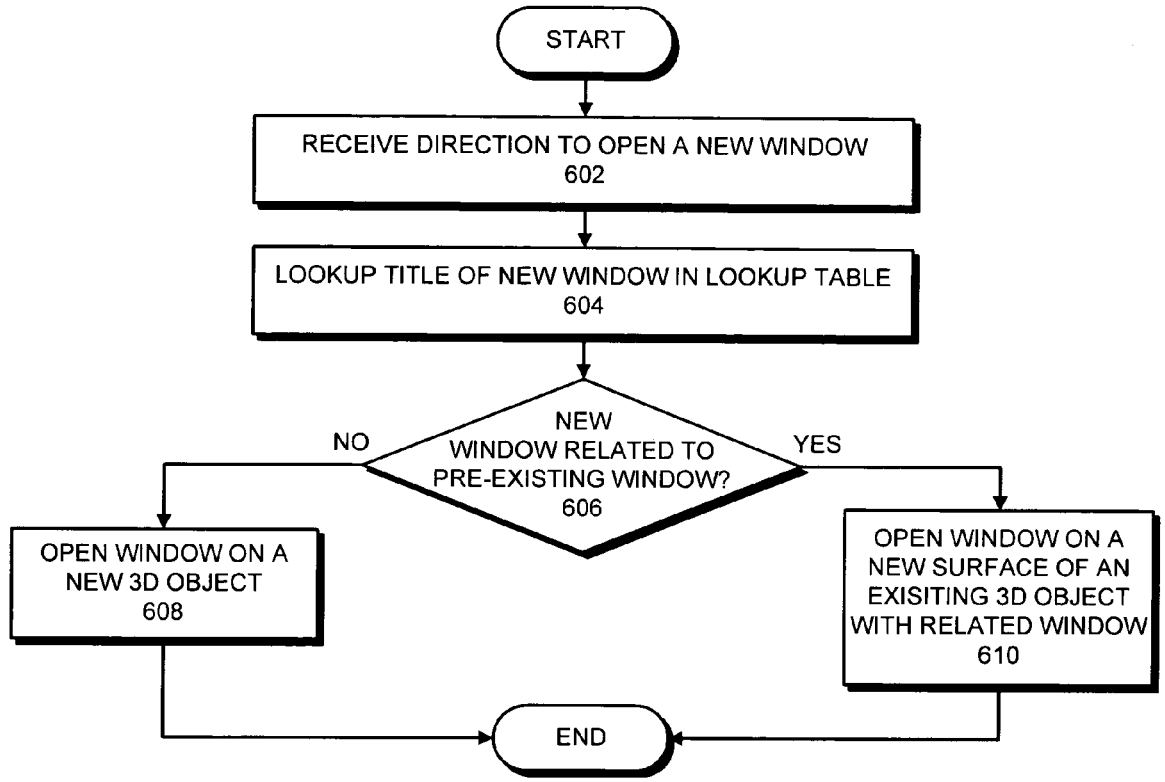
FIG. 6 presents a flow chart of the process of displaying a window in accordance with an embodiment of the present invention.

FIG. 6 presents a flow chart of the process of displaying a window in accordance with an embodiment of the present invention. The process starts when 3D scene manager 134 receives a direction to open a new window in 3D display model 102 (step 602). 3D scene manager 134 looks-up the title of the window to open in lookup table 135 (step 604) and determines if the window title is linked to the title of any of the windows that are currently open within 3D display model 102 (step 606). If the title is not linked, or is not listed in lookup table 105, 3D scene manager 134 opens the window on a new 3D object within 3D display model 102 (step 608). However, if the title is linked, 3D scene manager 134 opens the window on a different surface of the 3D object that is displaying the related window (step 610). Note that displaying the new window on an existing 3D object might result in changing the orientation of the 3D object so that the pre-existing related window is no-longer visible from viewpoint 106.

Table 1 illustrates an exemplary lookup table 135 in accordance with an embodiment of the present invention.

TABLE 1

| Front window name | Windows that can be placed on the back |
|---|---|
| ^Web Browser .*$ | ^Preferences$\|^Alert$ |
| ^Editor .*$ | ^Preferences$\|^Save As$\|^Open$ |
| ^Music Player .*$ | ^Note Pad$ |
| ^Photo Viewer .*$ | ^Email$ |

When a request to show a new window is sent to 3D scene manager 134, 3D scene manager 134 first finds the row in lookup table 135 whose "Front window name" matches the currently focused window based on specific regular expression. Next, 3D scene manager 134 checks if the requested window's title matches to the regular expression shown in the "Windows that can be placed on the back" column. If it matches, 3D scene manager 134 rotates the window by 180 degrees so that the user can see the back side of the window. Finally, 3D scene manager 134 places the requested window on the back side of the window.

Displaying a Modal Dialog

Figure 7:
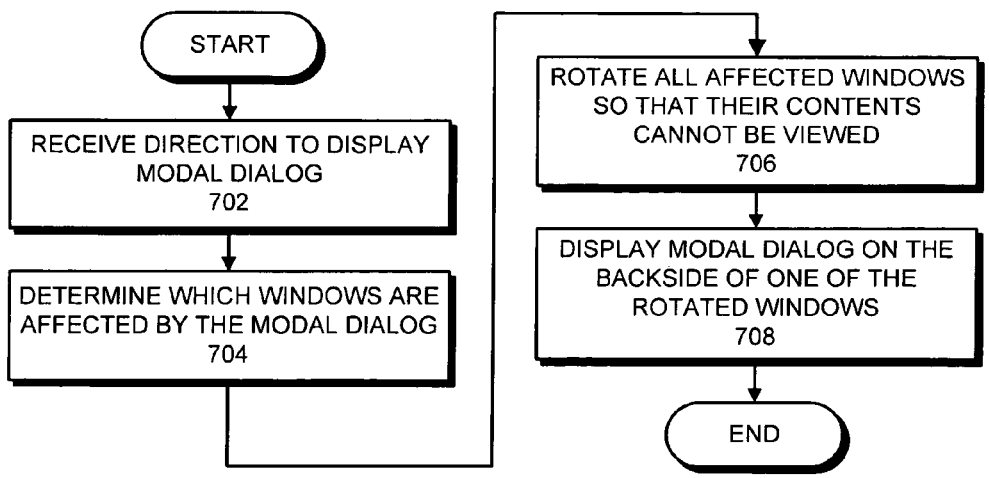
FIG. 7 presents a flow chart of the process of displaying a modal dialog in accordance with an embodiment of the present invention.

FIG. 7 presents a flow chart of the process of displaying a modal dialog in accordance with an embodiment of the present invention. The system starts when 3D scene manager 134 is directed to display a modal dialog (step 702) or any other dialog that requires user intervention before operations may continue on an open application. 3D scene manager 134 then determines all of the currently visible windows that are affected by the modal dialog (step 704). Next, 3D scene manager 134 makes affected windows less visible. This can be accomplished by rotating all of the affected windows so that they are no longer visible to viewpoint 106 (step 706). Finally, 3D scene manager 134 displays the modal dialog on the backside of one of the rotated windows (step 708).

Object Translucency

Figure 8:
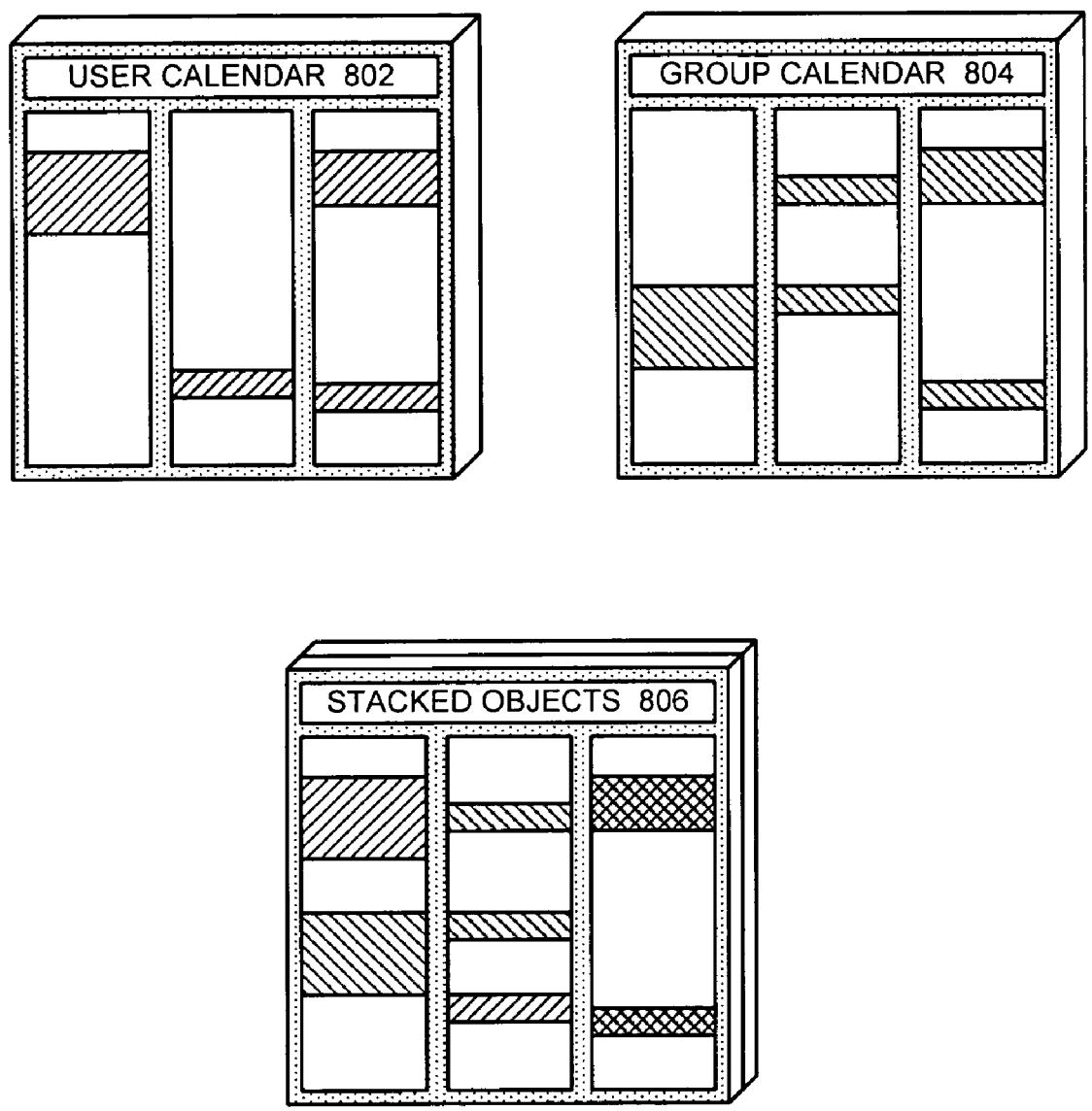
FIG. 8 illustrates object translucency in accordance with an embodiment of the present invention.

FIG. 8 illustrates an example where object translucency can be used to facilitate displaying related information in accordance with an embodiment of the present invention. In this example, the 3D interface displays user calendar 802, group calendar 804, and stacked objects 806. Note that stacked objects 806 comprises user calendar 802 placed on top of group calendar 804 as seen from viewpoint 106. When the cursor is moved off of an object in 3D display model 102, the object becomes semi-translucent. This allows an observer to see any object located behind or underneath of the object.

In the illustrated example, when the user locates the mouse cursor over the top of stacked objects 806, the user will see only user calendar 802. However, when the cursor is moved off of stacked objects 806, objects in stacked objects 806 become translucent, thereby allowing the user to see all of the objects simultaneously. In this instance, appointments (designated by the cross-hatched regions) on both user calendar 802 and group calendar 804 are visible to the user at the same time, and allow for the user to visually detect any calendaring conflicts.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for displaying multiple two-dimensional (2D) windows with related content within a three-dimensional (3D) display model, comprising:
   receiving a command to display a first window within the 3D display model;
   displaying content of the first window on a first surface of a 3D object;
   receiving a command to display a second window within the 3D display model, wherein content of the second window is related to content of the first window;
   looking up an identifier for the second window in a lookup table that contains entries specifying relationships between windows;
   determining if the second window is related to the first window;
   if so, displaying content of the second window on the second surface of the 3D object; and
   if not, displaying content of the second window on a surface of a distant 3D object, which is not located in close proximity to the 3D object in the 3D display model.

2. The method of claim 1, wherein the second surface of the 3D object is located on the opposite side of the 3D object from the first surface, and wherein only one of the first surface of the 3D object and the second surface of the 3D object is visible at any given time.

3. The method of claim 2, further comprising rotating the 3D object so that the second surface is visible.

4. The method of claim 1, further comprising:
   receiving a command to display a third window within the 3D display model; and
   displaying content of the third window on a surface of a second 3D object, wherein the second 3D object is located in close proximity to the 3D object in the 3D display model.

5. The method of claim 2, further comprising:
   receiving a modal dialog related to the content of the first window, wherein the modal dialog must be responded to before any other action may be taken on an application;
   rotating the 3D object so that the second surface is visible and the first surface is hidden; and
   displaying the modal dialog on the second surface.

6. The method of claim 5, further comprising rotating any related 3D objects so that related content on the surface of the related 3D objects is not visible until the modal dialog is acknowledged.

7. The method of claim 4, wherein the 3D object is stacked on top of the second 3D object so that the second 3D object is obscured by the 3D object from the viewpoint of a user.

8. The method of claim 7, wherein the 3D object is translucent so that the second 3D object is visible through the 3D object.

9. The method of claim 1, wherein the first window and the second window are associated with different applications.

10. The method of claim 1, further comprising:
    receiving a notification that the first window and the second window contain related content; and
    creating an association between the first window and the second window in a lookup table.

11. A computer-readable storage medium storing instructions that when executed by a computer cause the computer to perform a method for displaying multiple two-dimensional (2D) windows with related content within a three-dimensional (3D) display model, the method comprising:
    receiving a command to display a first window within the 3D display model;
    displaying content of the first window on a first surface of a 3D object;
    receiving a command to display a second window within the 3D display model, wherein content of the second window is related to content of the first window;
    looking up an identifier for the second window in a lookup table that contains entries specifying relationships between windows;
    determining if the second window is related to the first window;
    if so, displaying content of the second window on the second surface of the 3D object; and
    if not, displaying content of the second window on a surface of a distant 3D object, which is not located in close proximity to the 3D object in the 3D display model.

12. The computer-readable storage medium of claim 11, wherein the second surface of the 3D object is located on the opposite side of the 3D object from the first surface, and wherein only one of the first surface of the 3D object and the second surface of the 3D object is visible at any given time.

13. The computer-readable storage medium of claim 12, wherein the method further comprises rotating the 3D object so that the second surface is visible.

14. The computer-readable storage medium of claim 12, wherein the method further comprises:
    receiving a modal dialog related to the content of the first window, wherein the modal dialog must be responded to before any other action may be taken on an application;
    rotating the 3D object so that the second surface is visible and the first surface is hidden; and
    displaying the modal dialog on the second surface.

15. The computer-readable storage medium of claim 14, wherein the method further comprises rotating any related 3D objects so that related content on the surface of the related 3D objects is not visible until the modal dialog is acknowledged.

16. The computer-readable storage medium of claim 11, wherein the method further comprises:
    receiving a command to display a third window within the 3D display model; and displaying content of the third window on a surface of a second 3D object, wherein the second 3D object is located in close proximity to the 3D object in the 3D display model.

17. The computer-readable storage medium of claim 16, wherein the 3D object is stacked on top of the second 3D object so that the second 3D object is obscured by the 3D object from the viewpoint of a user.

18. The computer-readable storage medium of claim 17, wherein the 3D object is translucent so that the second 3D object is visible through the 3D object.

19. The computer-readable storage medium of claim 11, wherein the first window and the second window are associated with different applications.

20. The computer-readable storage medium of claim 11, wherein the method further comprises:
   receiving a notification that the first window and the second window contain related content; and
   creating an association between the first window and the second window in a lookup table.

21. An apparatus for displaying multiple two-dimensional (2D) windows with related content within a three-dimensional (3D) display model, comprising:
   a receiving mechanism configured to receive a command to display a first window within the 3D display model;
   a display mechanism configured to display content of the first window on a first surface of a 3D object;
   wherein the receiving mechanism is further configured to receive a command to display a second window within the 3D display model, wherein content of the second window is related to content of the first window;
   a lookup mechanism configured to lookup an identifier for the second window in a lookup table that contains entries specifying relationships between windows; and
   a determination mechanism configured to determine if the second window is related to the first window;
   wherein the display mechanism is further configured to display content of the second window on the second surface of the 3D object if the second window is related to the first window; and
   wherein the display mechanism is further configured to display content of the second window on a surface of a distant 3D object, which is not located in close proximity to the 3D object in the 3D display model, if the title of the second window is not related to an identifier for the first window.

22. The apparatus of claim 21, wherein the second surface of the 3D object is located on the opposite side of the 3D object from the first surface, and wherein only one of the first surface of the 3D object and the second surface of the 3D object is visible at any given time.

23. The apparatus of claim 22, further comprising a rotation mechanism configured to rotate the 3D object so that the second surface is visible.

24. The apparatus of claim 22, further comprising:
   wherein the receiving mechanism is configured to receive a modal dialog related to the content of the first window, wherein the modal dialog must be responded to before any other action may be taken on an application; and
   a rotation mechanism configured to rotate the 3D object so that the second surface is visible and the first surface is hidden;
   wherein the display mechanism is further configured to display the modal dialog on the second surface.

25. The apparatus of claim 24, wherein the rotation mechanism is further configured to rotate any related 3D objects so that related content on the surface of the related 3D objects is not visible until the modal dialog is acknowledged.

26. The apparatus of claim 21, wherein the receiving mechanism is further configured to receive a command to display a third window within the 3D display model, and wherein the display mechanism is further configured to display content of the third window on a surface of a second 3D object, wherein the second 3D object is located in close proximity to the 3D object in the 3D display model.

27. The apparatus of claim 26, wherein the 3D object is stacked on top of the second 3D object so that the second 3D object is obscured by the 3D object from the viewpoint of a user.

28. The apparatus of claim 27, wherein the 3D object is translucent so that the second 3D object is visible through the 3D object.

29. The apparatus of claim 21, wherein the first window and the second window are associated with different applications.

30. The apparatus of claim 21, further comprising:
   a notification mechanism configured to receive a notification that the first window and the second window contain related content; and
   an association mechanism configured to create an association between the first window and the second window in a lookup table.

* * * * *